United States Patent
Ladra et al.

(10) Patent No.: US 7,654,746 B2
(45) Date of Patent: Feb. 2, 2010

(54) SPINDLE BEARING DEVICE AND CORRESPONDING BEARING METHOD

(75) Inventors: Uwe Ladra, Erlangen (DE); Elmar Schäfers, Nürnberg (DE); Dietmar Stoiber, Fürth (DE); Bernd Wedel, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 372 days.

(21) Appl. No.: 11/574,043

(22) PCT Filed: Aug. 16, 2005

(86) PCT No.: PCT/EP2005/054033

§ 371 (c)(1),
(2), (4) Date: Feb. 21, 2007

(87) PCT Pub. No.: WO2006/024603

PCT Pub. Date: Mar. 9, 2006

(65) Prior Publication Data

US 2009/0052819 A1 Feb. 26, 2009

(30) Foreign Application Priority Data

Sep. 1, 2004 (DE) .................. 10 2004 042 316

(51) Int. Cl.
F16C 19/04 (2006.01)
F16C 27/06 (2006.01)
F16C 3/00 (2006.01)

(52) U.S. Cl. .................. 384/490; 384/517; 384/536; 384/611

(58) Field of Classification Search .................. 384/99, 384/490, 535–536, 581, 611

See application file for complete search history.

(56) References Cited

U.S. PATENT DOCUMENTS

| | | | | |
|---|---|---|---|---|
| 3,037,573 A * | 6/1962 | Larsen | ...... | 180/381 |
| 3,307,890 A | 3/1967 | Johansson | | |
| 3,738,720 A * | 6/1973 | Loehle | ...... | 384/537 |
| 4,180,946 A | 1/1980 | Heijkenskjold et al. | | |
| 4,353,604 A * | 10/1982 | Dulberger et al. | ...... | 384/584 |
| RE31,394 E * | 9/1983 | Streifert | ...... | 384/99 |
| 4,453,783 A * | 6/1984 | Davis et al. | ...... | 384/99 |
| 4,601,591 A * | 7/1986 | Wright | ...... | 384/536 |
| 4,909,450 A * | 3/1990 | Henne et al. | ...... | 241/119 |
| 4,947,639 A * | 8/1990 | Hibner et al. | ...... | 60/772 |
| 4,971,458 A * | 11/1990 | Carlson | ...... | 384/99 |
| 4,976,177 A | 12/1990 | Fouche | | |
| 5,205,384 A * | 4/1993 | Heshmat | ...... | 188/264 B |
| 6,135,639 A * | 10/2000 | Dede | ...... | 384/99 |
| 6,361,893 B1 | 3/2002 | George et al. | | |

(Continued)

FOREIGN PATENT DOCUMENTS

DE 695 20 003 T2 6/1996

(Continued)

*Primary Examiner*—Marcus Charles
(74) *Attorney, Agent, or Firm*—Henry M. Feiereisen; Ursula B. Day

(57) ABSTRACT

In a spindle rotor, the orientation of the figure axis is accepted and the anchoring of the rotor bearing (SL) is configured such that the orientation of the geometric rotational axis adapts to the physical main axis of inertia. The bearing is configured in the form of an actively controlled bearing, whereby the orientation is measured and is dynamically carried out, but also in the form of bearing comprising passive elements which are associated with the external ring of the bearing and enable a correspondingly dynamic orientation of the bearing. A damper (T) is provided to dampen the vibrations of the bearing (SL).

2 Claims, 2 Drawing Sheets

U.S. PATENT DOCUMENTS 6,480,363 B1 * 11/2002 Prater .................. 384/536
7,223,020 B2 * 5/2007 Bauer et al. ............. 384/581

FOREIGN PATENT DOCUMENTS

| DE | 101 26 016 A1 | | 12/2002 |
| DE | 299 24 562 U1 | | 1/2004 |
| DE | 102 50 292 A1 | | 5/2004 |
| FR | 2 463 331 A | | 8/1979 |
| GB | 924 779 A | | 2/1962 |
| JP | 05/157114 A | | 6/1993 |
| JP | 09/317769 A | | 12/1997 |
| JP | 2003329512 A | * | 11/2003 |

* cited by examiner

SPINDLE BEARING DEVICE AND CORRESPONDING BEARING METHOD

BACKGROUND OF THE INVENTION

The present invention relates to a spindle bearing device with two bearing means for mounting a spindle which has a main axis of inertia, the two bearing means forming an axis of rotation. Furthermore, the present invention relates to a corresponding method for mounting a spindle.

When ball-mounted spindles are operated at high rotational speeds, this gives rise to very high undesirable alternating forces on the bearings. The reason for this is the existing unbalance of the rotating spindle rotor. The spindle rotor is a body with a rotationally symmetrical contour, which possesses a geometric axis of symmetry. The geometric axis of symmetry is designated below as the "figure axis".

It is known from the physics of rotating bodies that any body, even when it is constructed completely asymmetrically, possesses at least three axes, about which it can rotate in a stable manner, without in this case executing disruptive wobbling or vibratory movements. Such an axis is called a main axis of inertia. Rotation about the main axis of inertia is always stable and is maintained without external forces being supplied. This is also the state which is desired when rotating bodies are in operation, since rotation about the main axis of inertia is free of reactions, such as, for example, vibrations or alternating forces, on the bearing points.

The geometric position of a main axis of inertia of a rotor is determined by its mass distribution. If the above-addressed spindle rotor had a mass distribution configured perfectly rotationally symmetrically about the geometric axis of symmetry, the physical main axis of inertia would coincide with the figure axis. This state is aimed at in technology, but can be achieved only up to a certain extent within the scope of the technically and economically implementable possibilities.

The rotor is carried by two ball bearings which are spaced sufficiently far apart from one another on the longitudinal axis of the rotor. The points at which the bearings are located are called the "A-side" and the "B-side" bearing plane. In this case, it is unimportant that, in technically executed spindles, a plurality of individual bearings are often combined into a bearing group and then define the respectively bearing plane. If the outer ring of the bearings is assumed to be anchored firmly in space, then the ball mounting predetermines the later axis of rotation of the rotor in geometric terms. The axis of rotation is then the straight connecting line which connects the A-side and the B-side bearing center to one another. Since the bearing inner ring is designed to be rotationally symmetrical with respect to the bearing center, the axis of rotation of the rotor consequently coincides with its figure axis.

The firm anchoring used according to the prior art for the bearing outer ring places the axis of rotation of the spindle rotor onto its geometric figure axis. However, the physical main axis of inertia will generally not be entirely identical to the rotor axis of rotation imposed by the mounting. For this reason, when the rotor rotates, undesirable vibrations or alternating forces are transmitted to the bearings and their anchoring and increase with a rising rotational speed. These present a problem, particularly in the case of spindles rotating at high speed, and generate disturbing noises, high vibrations and consequently increased wear, thus giving rise to high exchange rates of the bearings which entail costs and standstill times on the machine.

The spindle housing which carries the bearing outer ring is not infinitely rigid, but is anchored to a structure with finite mass and with finite mechanical rigidity. Since the mechanical structure damping is very low, as is known, the anchoring of the spindle housing therefore exhibits pronounced resonances. When the spindle rotor is operated at rotational speeds at which the structural resonance of the anchoring of the spindle housing is excited, then vibrations, bearing forces and noises are intensified considerably due to the insertion of the spindle into the machine structure. Since the manufacturer of the spindles is not aware of the properties of the machine structure into which the spindle will be inserted later, it is virtually impossible for him to give a quantitative forecast about the spindle in the installed state. This is a serious problem for the manufacturers of spindles rotating at high speed which cannot easily be solved.

In order to minimize the abovementioned disturbing vibrations and alternating forces on the bearings and their anchoring, the physical main axis of inertia must be identified as closely as possible with the geometrically imposed axis of rotation. This method is the prior art and is designed as "balancing". In this case, the mass distribution of the rotor is influenced, and its physical main axis of inertia is thus displaced into the desired position. This takes place by the addition or removal of mass at a suitable point on the rotor. The result of the balancing (correction of the mass distribution) is checked via an evaluation of the oscillation velocity or the bearing forces. For this purpose, there are balancing machines and appliances which indicate the balancing state and calculate suitable stipulation values for the mass correction.

It has been shown that even deviations of the order of only a few micrometers between the orientation of the geometrically imposed axis of rotation and the physical main axis of inertia lead to unacceptably high vibrations. However, in practice, completely exact identity between the geometric axis of rotation and the physical main axis of inertia cannot be achieved even by means of the balancing machines mentioned. There are several reasons for this:

The measurement accuracy of the balancing machines is limited.

The spindle rotor is subject, during operation, to a dimensional variation which is generated by temperature and centrifugal forces. The mass distribution changes as a result, and the physical main axis of inertia then no longer lies on the geometric axis of rotation. It has been shown, above all in spindles rotating at high speed, that the spindle rotor is not completely stable with respect to the centrifugal forces which it itself generates. The form of the rotor, in particular the curvature of the geometric rotor axis, is then dependent on rotational speed.

Particularly in spindles for machine tools, the tools are fastened to the rotor only after the balancing of the rotor, when the machine tool is in operation. The orientation of the physical main axis of inertia is then determined by the distribution of the mass of the rotor and tool. A balancing of the overall rotor/tool system would be required for this purpose, but this is almost always absent for economic reasons.

Tremendous centrifugal forces act on the masses which lie on the outside of rotor. For example, in a spindle rotating at high speed (24000 revolutions per minute), a mass of 1 gram is pulled outward, in the case of radius of 40 mm, with a force which corresponds to a weight of 25 kg. Under the influence of the high centrifugal forces, plastic deformations of parts of the spindle rotor subside only at a very late stage. Consequently, however, the position of the physical main axis of inertia also changes, so that the original balancing state deteriorates.

SUMMARY OF THE INVENTION

The object of the present invention is, therefore, to make available a rotor for a spindle rotating at high speed with a permanently good balancing state, independent of the rotational speed.

According to the invention, this object is achieved by means of a spindle bearing device with two bearing means for mounting a spindle which has a main axis of inertia, the two bearing means forming an axis of rotation, and with an orientation means which is coupled to at least one of the bearing means, for adapting the axis of rotation to the main axis of inertia.

Furthermore, according to the invention, a method is provided for mounting a spindle by means of bearings of the spindle, which has a main axis of inertia, with the aid of two bearing means which form an axis of rotation and adapting the axis of rotation to the main axis of inertia.

Thus, according to the present invention, the orientation of the physical main axis of inertia of the rotor or of the spindle is accepted, the anchoring of the spindle bearing or rotor bearing being configured such that the orientation of the geometric axis of rotation is adapted to the physical main axis of inertia.

According to an advantageous embodiment, the orientation means comprises at least one active component. Unbalances can thus be compensated very accurately. For this purpose, in or on at least one of the bearing means, a force or acceleration can be measured, and this can be used for regulating the position of the axis of rotation. A measuring means, a regulating means and an actuating means are correspondingly, to be provided. A special advantage for force regulation would be that actuators also used as sensors could be employed.

According to an alternative embodiment, the orientation means may have only passive components. A reduction in unbalances of the rotating spindle rotor can thereby be implemented very simply and robustly.

In an advantageous further development, a spring means may be provided, by which a bearing outer ring of a bearing of one of the bearing means can be coupled spring-elastically to a spindle housing. The figure axis of the spindle can thereby be moved spring-elastically out of the axis of rotation.

In this case, advantageously, the bearing outer ring has mounted on it a vibration absorber. This may have, for example, an annular configuration, so that it can be arranged coaxially around a portion of the spindle.

Furthermore, the vibration absorber may be arranged on the bearing outer ring via a spring/damper element. A marked reduction in the forces on the bearing can thereby be achieved.

Moreover, it proves beneficial to use oil damping for the spring/damper element. An exceptionally high damping action can thereby be achieved.

BRIEF DESCRIPTION OF THE DRAWING

The present invention, then, is explained in more detail with reference to the accompanying drawings in which.

DETAILED DESCRIPTION OF PREFERRED EMBODIMENTS

The exemplary embodiments outlined in more detail below constitute preferred embodiments of the present invention. According to the invention, as mentioned, the anchoring of the rotor bearing is configured such that the orientation of the geometric axis of rotation is adapted to the physical main axis of inertia. For this purpose, two solutions are disclosed:

a) Actively regulated bearing, in which the orientation is measured and tracked dynamically.

b) Passive elements which are assigned to the bearing outer ring and allow a correspondingly dynamic orientation of the bearing.

In this case, it must then also be accepted that the geometric orientation of the spindle rotor is no longer imposed by the mounting, but is adapted to the orientation of the physical main axis of inertia. A tool which is added to the spindle rotor will then likewise follow the physical main axis of inertia. Good basic balancing is therefore advantageous even in the case of a spindle mounting according to the invention. Since the deviation between the figure axis and the physical main axis of inertia then amounts to only a few micrometers, the mispostion of the tool can be dealt with in the same way as the tool radius correction carried out according to the prior art for a numerically controlled machine tool.

The essential advantage of the spindle mounting according to the invention is the low-vibration running of the spindle rotor independently of its balancing state. In the event of a deterioration of the balancing state, the vibrations are not increased. Furthermore, the interactions between the spindle rotor and the machine structure are reduced to a minimum. This affords the manufacturer of the spindle a degree of certainty in planning terms with considerable economic advantages due to low wear and therefore greater exchange intervals.

Figure 1:
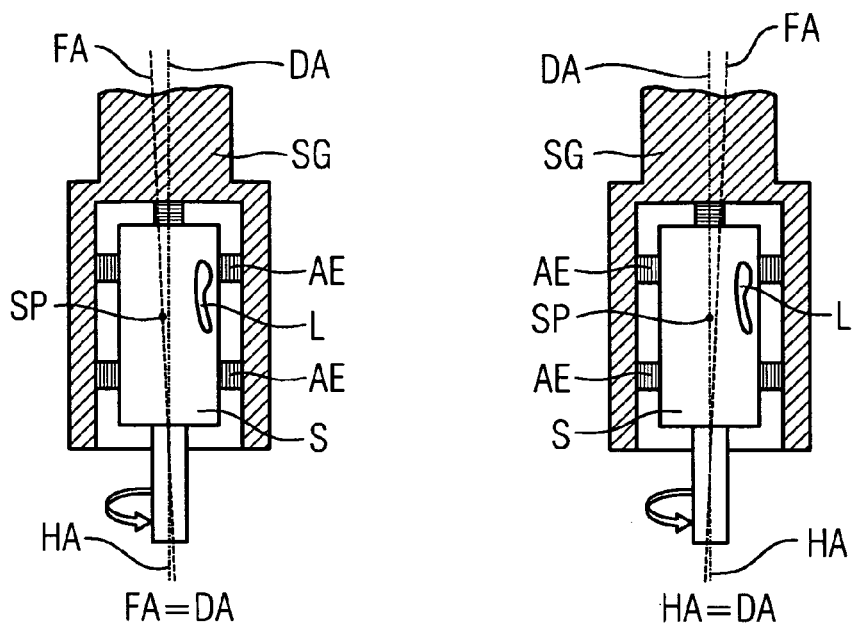
FIG. 1 shows a basic diagram of an active spindle bearing for two axial positions.

Regarding a) Spindle Mounting According to the Invention with Active Actuating Elements In the spindle mounting according to the invention, as shown in FIG. 1, of a spindle S in a spindle housing SG with active actuating elements AE, these ensure that the physical main axis of inertia HA is at any time imposed onto the axis of rotation DA. The actual figure axis FA then runs eccentrically (see FIG. 1). The distance between the main axis of inertia HA and the figure axis FA continues to be maintained, since there is no mass compensation here. In the present example according to FIG. 1, mass displacement arises due to a cavity or void L which then leads to a displacement of the center of gravity SP of the spindle.

The acceleration occurring on the bearing is measured via suitable sensor means. The active actuating elements are activated by means of a regulating algorithm such that the axis of rotation DA is regulated as exactly as possible to the main axis of inertia HA. What is achieved thereby is that the alternating forces in the bearings are markedly reduced. With an exact position, the spindle S then rotates completely without vibrations and alternating forces. Piezoelectric or magnetostrictive actuators may be considered as active actuating elements AE in this application. Spindle rotational speeds of 40 000 revolutions per minute signify, for these actuators, frequencies of 666 Hz, which presents no problem because the actuators can easily be activated into the kHz range.

Force regulation of the spindle bearing could likewise be envisaged. In this case, the actuators could be operated both as an actuator and as a sensor. The advantage of this would be that the bearing force could be regulated directly to zero. Moreover, it would be conceivable to activate force regulation only from a defined rotational speed (for example 5000 revolutions per minute) where the alternating forces have a marked effect in the bearings.

Regarding b) Spindle Mounting According to the Invention with Passive Elements

Figure 2:
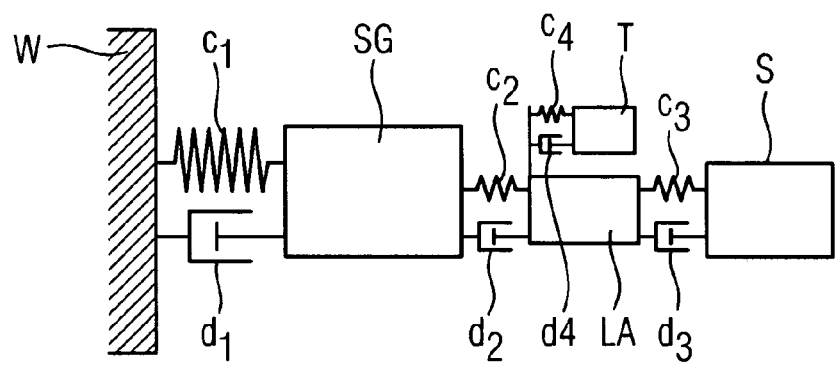
FIG. 2 shows a mechanical model of a passive spindle mounting with a vibration absorber and with a spring/damper element.

In the spindle mounting according to the invention, as shown in FIG. 2, with passive elements (vibration absorber with spring/damper element), the sought-after mechanical orientation of the axis of rotation with respect to the physical main axis of inertia is achieved by means of a spring-elastic coupling $c_2d_2$ of the bearing outer ring LA to the spindle housing SG. In this case, the spindle housing SG is coupled to a wall W via a further elastic tie-up $c_1d_1$. The bearing outer ring LA, in turn, is coupled spring-elastically to the spindle S via the resilience of the balls in the bearing $c_3d_3$. A vibration absorber, which constitutes an additional mass, is coupled to the bearing outer ring LA via a further spring-elastic coupling element $c_4d_4$.

At a low rotational speed, the axis of rotation DA lies on the figure axis FA. With an increasing rotational speed, the axis of rotation DA converges toward the physical main axis of inertia HA. The vibrations and transmitted alternating forces are thereby effectively limited to the outer bearing tie-up. At high rotational speeds, the maximum deflection of the bearing outer ring LA corresponds to the deviation between the orientation of the figure axis FA and the physical main axis of inertia HA of the rotor or spindle S. The transmitted alternating forces then arise in a simple way from the spring constant $c_2$.

As is known, undesirable resonances may occur when masses are coupled to springs. This also applies to the spring-elastic coupling of the mass of the spindle rotor. According to experience, resonances can be prevented when correspondingly high damping is provided. In general, a damper $d_2$ is connected in parallel to the spring-elastic element $c_2$. In the case of the spindle mounting according to the invention, however, substantial damping $d_2$ should in no way be connected in parallel to the spring-elastic element $c_2$, because this becomes hard in the case of high-frequency vibratory movements and consequently the vibration forces would be transmitted in full to the spindle housing. Because this is undesirable, the damper $d_2$ illustrated is only parasitic and should therefore not be too great.

The actual suppressing of the resonance displaced downward by the elastic coupling $c_2$ takes place by means of a damped vibration absorber T. It does not lie in the direct force flux between the spindle rotor S and spindle housing SG. This vibration absorber T is an additional mass which coupled to the spindle mounting by the spring/damper element $c_4d_4$. It draws the energy out of the resonant oscillation and consequently prevents the vibration amplitude from becoming excessive at resonance transit, but at high rotational speeds, in contrast to $d_2$, does not constitute a force bridge between the spindle rotor S and spindle housing SG because it is connected in parallel to this. In order to damp the resonant frequency optimally, it is beneficial to coordinate the vibration absorber T with this frequency of the undamped spindle rotor S.

Figure 3:
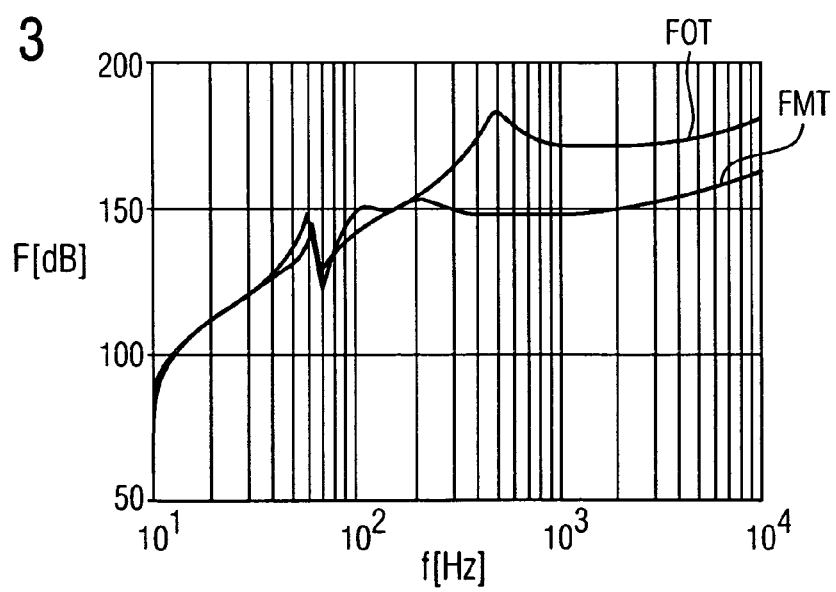
FIG. 3 shows amplitude responses of the force for various spindle bearings.

The spindle mounting according to the invention has considerable advantages particularly in avoiding the excitation of structural resonances of the machine tool. The structure of the machine tool into which the spindle S has been inserted is symbolized in FIG. 2 by the spring $c_1$ and the "fixed wall" W. The spindle housing SG can resonate with respect to the "fixed wall" W. Rotational speeds which excite this resonance then lead to particularly high vibrations. In FIG. 3, this situation is calculated for a typical configuration. The vibrations (deflection or force) are illustrated. The curve FOT describes a spindle rotor mounting without vibration absorber according to the prior art. The excessive amplitude rise at 500 Hz (corresponding to a rotational speed of 30 000 revolutions per minute) is markedly pronounced and in a real machine tool would lead to objections.

The vibration amplitude with a spindle mounting according to the invention is illustrated in FIG. 3 by the curve FMT. The resonant frequency of the spindle mounting according to the invention is in this case displaced markedly downward. Above this resonant frequency, which can almost no longer be detected because of the vibration absorber, the amplitude still scarcely rises. Overall, in the relevant frequency range (rotational speeds higher than 5000 revolutions per minute), the vibration amplitude is markedly reduced, and the consequently extremely undesirable interaction between the spindle and machine structure is virtually eliminated.

FIG. 3 shows the profile of the forces acting on the bearing as a function of the frequency. In this case, it can be seen clearly that, in the spindle mounting with a vibration absorber, the resultant bearing force is lower by factors than in a conventional mounting. Only in the lower frequency range, where the elastic incorporation of the spindle housing into the machine structure takes effect, is the force profile slightly poorer. However, these rotational speeds are run through very quickly in the warm-up and are therefore not relevant any further.

Figure 4:
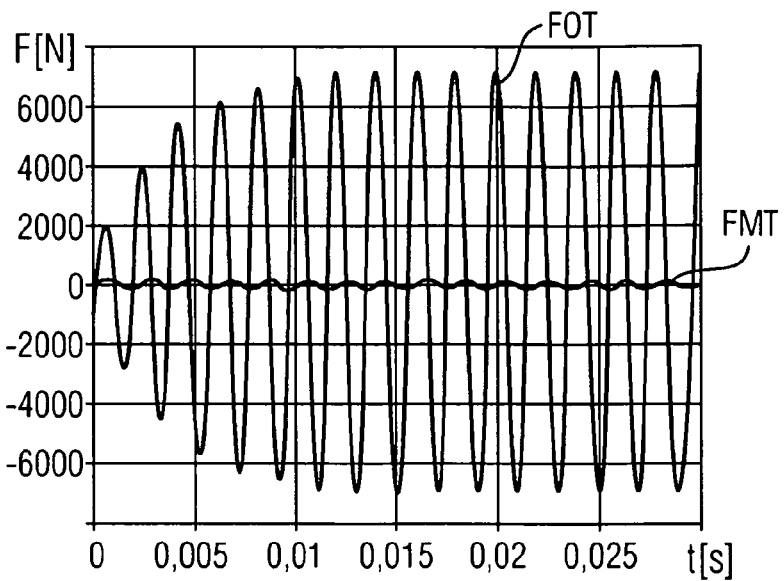
FIG. 4 shows time profiles for bearing forces of various mountings.
Figure 5:
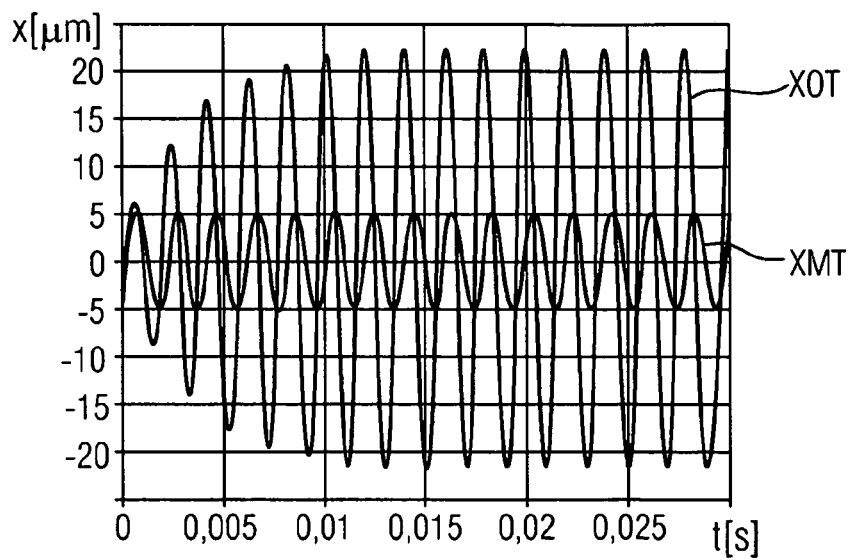
FIG. 5 shows time profiles of bearing deflections for various bearings.

FIG. 4 shows the time profile of the bearing forces and FIG. 5 shows the deflection of the spindle mounting. It can be seen clearly here that, on the one hand, the forces acting on the bearing are substantially lower and, on the other hand, the deflection on the bearing is also substantially lower. In particular, the bearing force without a vibration absorber FOT according to FIG. 4 is substantially higher than the bearing force with a vibration absorber FMT. Likewise, the bearing deflection without a vibration absorber XOT according to FIG. 5 is substantially higher than the bearing deflection with a vibration absorber XMT. The forces acting on the bearings can be reduced up to the factor 100 in the case of optimal coordination. The deflection on the bearing remains limited to the physical distance between the main axis of inertia and the figure axis, which corresponds to the unbalance and which in this simulation example would be set at 5 μm.

Figure 6:
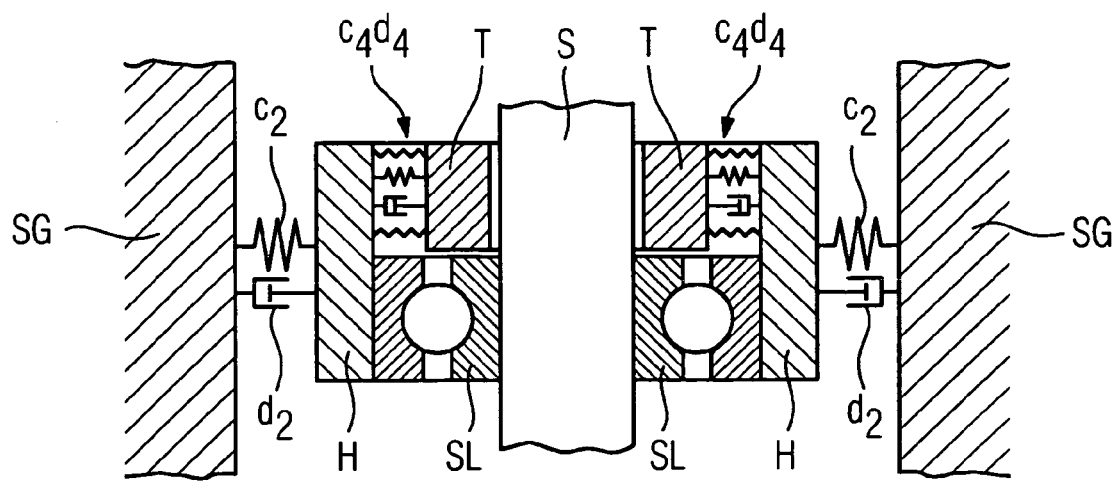
FIG. 6 shows the basic construction of a spindle bearing with a vibration absorber.

A spindle bearing according to the invention could be implemented according to the basic illustration of FIG. 6. The spindle S is mounted in a spindle bearing SL. Its outer rings are mounted firmly in a sleeve H. A damping spring-elastic element, for example in the form of a leaf spring element, is inserted between the sleeve H and the spindle housing SG. Furthermore, a vibration absorber ring T, which is arranged concentrically to the spindle S, is suspended with a damping spring-elastic effect on the sleeve H. This suspension takes place with the aid of the spring/damper component $c_4d_4$, as already described in connection with FIG. 2. The elastic coupling and the damping of this vibration absorber T should be coordinated with the parameters of the system. The damping $d_4$ could be implemented, for example, by means of an oil damper.

What is claimed is:

1. A spindle bearing device, comprising:

two bearings for supporting a spindle which has a main axis of inertia, said bearings defining an axis of rotation; and a solely passive orientation unit coupled to at least one of the bearings for adapting the axis of rotation to the main axis of inertia, said orientation unit including a vibration absorber, a spring/damper element for mounting the vibration absorber on an outer ring of one of the bearings, said spring/damper element including oil damping, and a spring mechanism for directly coupling an outer ring of one of the bearings to a spindle housing in a spring-elastic manner.

2. The spindle bearing device of claim 1, wherein the vibration absorber has an annular configuration.

* * * * *